United States Patent
Kuan

(10) Patent No.: US 9,523,461 B2
(45) Date of Patent: Dec. 20, 2016

(54) MOUNTING DEVICE FOR MULTIPLE SCREENS

(71) Applicant: HON HAI PRECISION INDUSTRY CO., LTD., New Taipei (TW)

(72) Inventor: Chang-Ming Kuan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1 day.

(21) Appl. No.: 14/491,461

(22) Filed: Sep. 19, 2014

(65) Prior Publication Data

US 2016/0058183 A1   Mar. 3, 2016

(30) Foreign Application Priority Data

Sep. 3, 2014  (TW) .............................. 103130361 A

(51) Int. Cl.
 *A47F 7/00*    (2006.01)
 *F16M 1/00*    (2006.01)

(52) U.S. Cl.
 CPC ...................................... *F16M 1/00* (2013.01)

(58) Field of Classification Search
 CPC .......... F16M 11/10; F16M 11/24; F16M 13/02
 See application file for complete search history.

(56) References Cited

U.S. PATENT DOCUMENTS

| | | | | |
|---|---|---|---|---|
| 3,976,162 A * | 8/1976 | Cummings | ............... | H04R 1/02 181/141 |
| 5,321,579 A * | 6/1994 | Brown | .................. | A47B 83/001 174/496 |
| 5,687,939 A * | 11/1997 | Moscovitch | ........... | F16M 11/12 248/122.1 |
| 5,768,096 A * | 6/1998 | Williams | ............... | G06F 1/1616 361/679.04 |
| 5,904,328 A * | 5/1999 | Leveridge | ............... | F16M 11/10 248/124.1 |
| 6,222,507 B1 * | 4/2001 | Gouko | .................. | G06F 1/1601 345/1.1 |
| 6,343,006 B1 * | 1/2002 | Moscovitch | ............ | B60R 11/02 348/794 |
| 6,505,988 B1 * | 1/2003 | Oddsen, Jr. | .......... | F16M 11/105 248/278.1 |

(Continued)

FOREIGN PATENT DOCUMENTS

| | | |
|---|---|---|
| CN | 202171108 U | 3/2012 |
| TW | M303313 U | 12/2006 |

(Continued)

*Primary Examiner* — Daniel J Troy
*Assistant Examiner* — Kimberley S Wright
(74) *Attorney, Agent, or Firm* — Zhigang Ma

(57) ABSTRACT

A mounting device for multiple screens includes a first fixing member, a second fixing member, a third fixing member, and a linking assembly. The first fixing member and the second fixing member can pivot on opposite sides of the third fixing member. The third fixing member is fixed to a wall or other structure and the linking assembly couples the first fixing member and the second fixing member together across the third fixing member. The screens are mounted on the first, the second, and the third fixing members. When one of the first fixing member or the second fixing member is rotated, the other is rotated at the same time and to the same degree by virtue of the linking assembly across the third fixing member.

12 Claims, 9 Drawing Sheets

(56) References Cited

U.S. PATENT DOCUMENTS

| | | | | |
|---|---|---|---|---|
| 6,527,237 B2* | 3/2003 | Harary | ............... | H04R 1/026 181/141 |
| 6,554,238 B1* | 4/2003 | Hibberd | ............... | A47B 81/061 248/278.1 |
| 7,331,551 B2* | 2/2008 | Oddsen, Jr. | ............... | F16M 11/04 248/278.1 |
| 7,537,190 B2* | 5/2009 | Fan | ............... | B60R 11/02 248/309.1 |
| 7,752,789 B2* | 7/2010 | Sun | ............... | F16M 13/00 108/70 |
| 7,997,550 B2* | 8/2011 | Kuhn | ............... | F16M 11/04 248/276.1 |
| 8,000,090 B2* | 8/2011 | Moscovitch | ............... | F16M 11/10 361/679.04 |
| 8,111,865 B2* | 2/2012 | Lau | ............... | H04R 1/026 381/386 |
| 8,150,093 B2* | 4/2012 | Ueno | ............... | H04N 5/642 381/388 |
| 8,240,628 B2* | 8/2012 | Huang | ............... | F16M 11/04 248/122.1 |
| 8,282,052 B2* | 10/2012 | Huang | ............... | F16M 11/045 248/125.1 |
| 8,488,306 B2* | 7/2013 | Mickey | ............... | F16M 11/06 248/278.1 |
| 8,675,906 B2* | 3/2014 | Lau | ............... | H04R 1/02 381/386 |
| 8,833,716 B2* | 9/2014 | Funk | ............... | F16M 13/02 248/309.1 |
| 8,864,092 B2* | 10/2014 | Newville | ............... | F16M 11/08 248/123.11 |
| 9,163,779 B2* | 10/2015 | Funk | ............... | F16M 13/02 |
| 9,164,538 B2* | 10/2015 | Moscovitch | ............... | F16M 11/04 |
| 2004/0011938 A1* | 1/2004 | Oddsen, Jr. | ............... | F16M 11/04 248/393 |
| 2005/0045788 A1* | 3/2005 | Mongeau | ............... | F16M 11/04 248/276.1 |
| 2008/0225472 A1* | 9/2008 | Chih | ............... | F16M 11/10 361/679.04 |
| 2008/0259541 A1* | 10/2008 | Woodward | ............... | A61B 19/26 361/679.02 |
| 2009/0091881 A1* | 4/2009 | Lee | ............... | F16M 11/046 361/679.21 |
| 2009/0173860 A1* | 7/2009 | Remy | ............... | F16M 11/04 248/278.1 |
| 2009/0308999 A1* | 12/2009 | Kim | ............... | F16M 11/048 248/299.1 |
| 2012/0056050 A1* | 3/2012 | Huang | ............... | F16M 11/045 248/124.1 |
| 2012/0119040 A1* | 5/2012 | Ergun | ............... | A47B 21/02 248/126 |
| 2013/0092805 A1* | 4/2013 | Funk | ............... | F16M 13/02 248/121 |
| 2013/0119210 A1* | 5/2013 | Moscovitch | ............... | F16M 11/043 248/122.1 |
| 2013/0230200 A1* | 9/2013 | Lau | ............... | H04R 1/02 381/332 |
| 2013/0306580 A1* | 11/2013 | Chen | ............... | F16M 11/10 211/41.1 |
| 2013/0320163 A1* | 12/2013 | Wong | ............... | F16M 13/022 248/205.1 |
| 2013/0320170 A1* | 12/2013 | Smed | ............... | F16M 11/10 248/274.1 |
| 2014/0021312 A1* | 1/2014 | Nguyen | ............... | F16M 11/10 248/205.1 |
| 2014/0117182 A1* | 5/2014 | Blackburn | ............... | F16M 11/18 248/298.1 |
| 2014/0291465 A1* | 10/2014 | Mendoza | ............... | F16M 13/02 248/346.06 |
| 2014/0340862 A1* | 11/2014 | Xu | ............... | F16M 11/10 361/807 |
| 2015/0060615 A1* | 3/2015 | Liu | ............... | F16M 11/10 248/125.7 |
| 2015/0192241 A1* | 7/2015 | Shannahan | ............... | F16M 11/043 248/178.1 |

FOREIGN PATENT DOCUMENTS

TW           M354778 U     4/2009
TW           M470150 U     1/2014

* cited by examiner

MOUNTING DEVICE FOR MULTIPLE SCREENS

FIELD

The present disclosure relates to mounting devices, and more particularly to a mounting device for multiple screens.

BACKGROUND

A big screen can be formed by a plurality of small screens. Therefore, a mounting device is needed to couple the small screens together to form the big screen.

BRIEF DESCRIPTION OF THE DRAWINGS

Implementations of the present technology will now be described, by way of example only, with reference to the attached figures.

DETAILED DESCRIPTION

Figure 1:
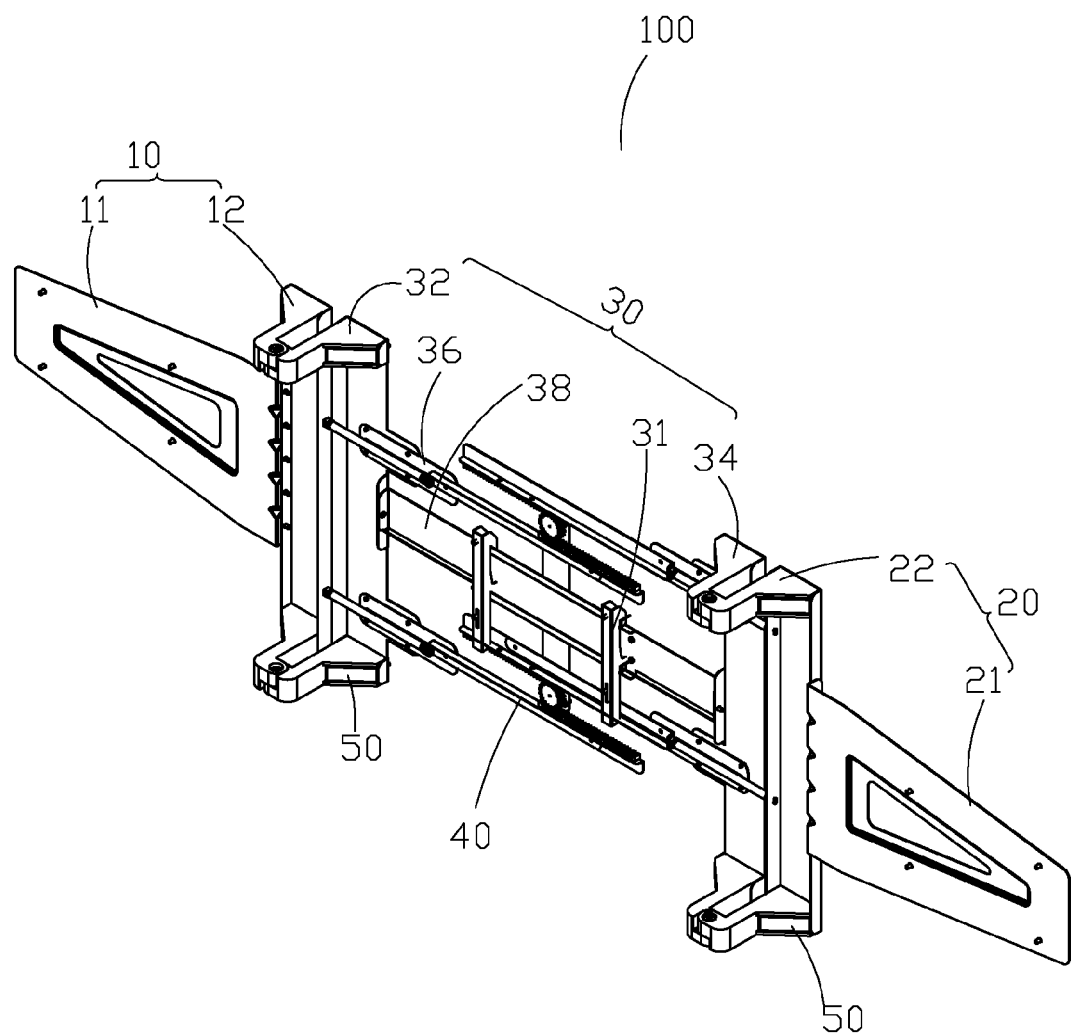
FIG. 1 is an isometric view of a mounting device for multiple screens with a first fixing member, a second fixing member, a third fixing member and a linking assembly, in accordance with an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a mounting device for multiple screens.

Figure 2:
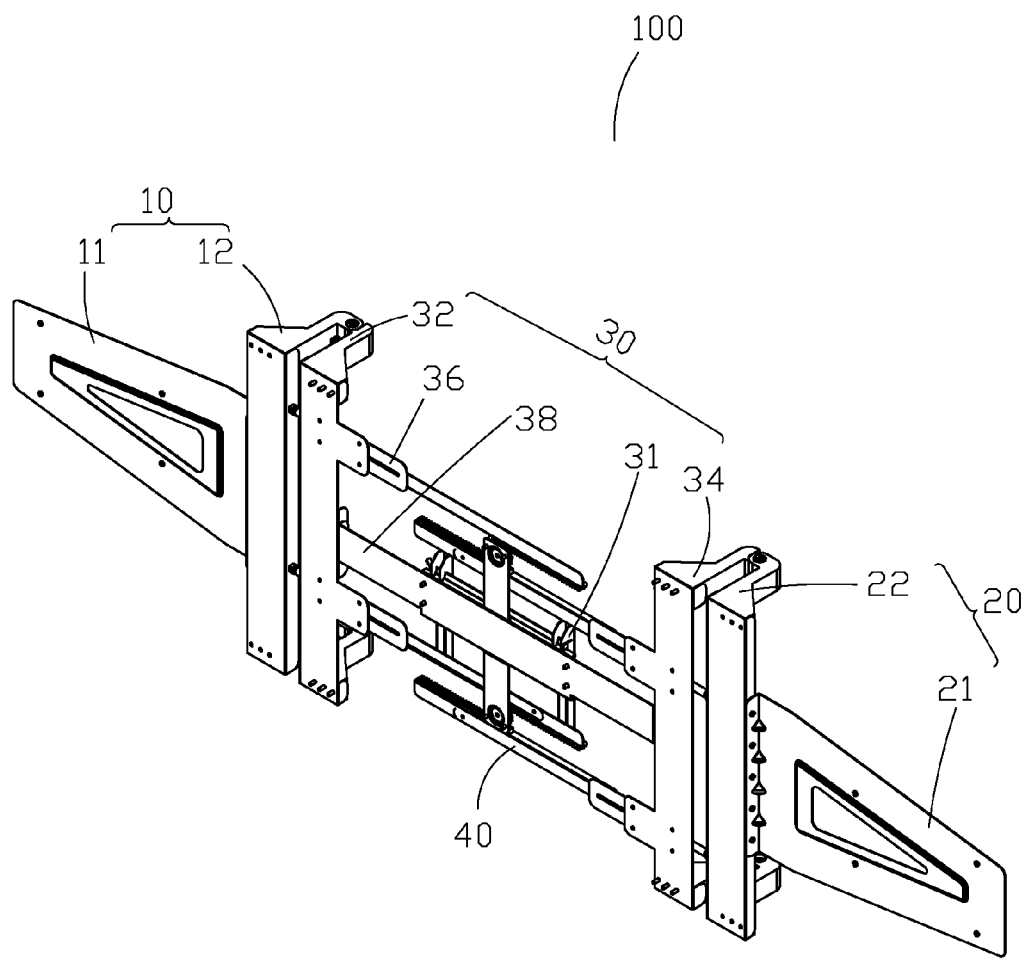
FIG. 2 is an isometric view of the mounting device of FIG. 1 viewed from a different angle.
Figure 8:
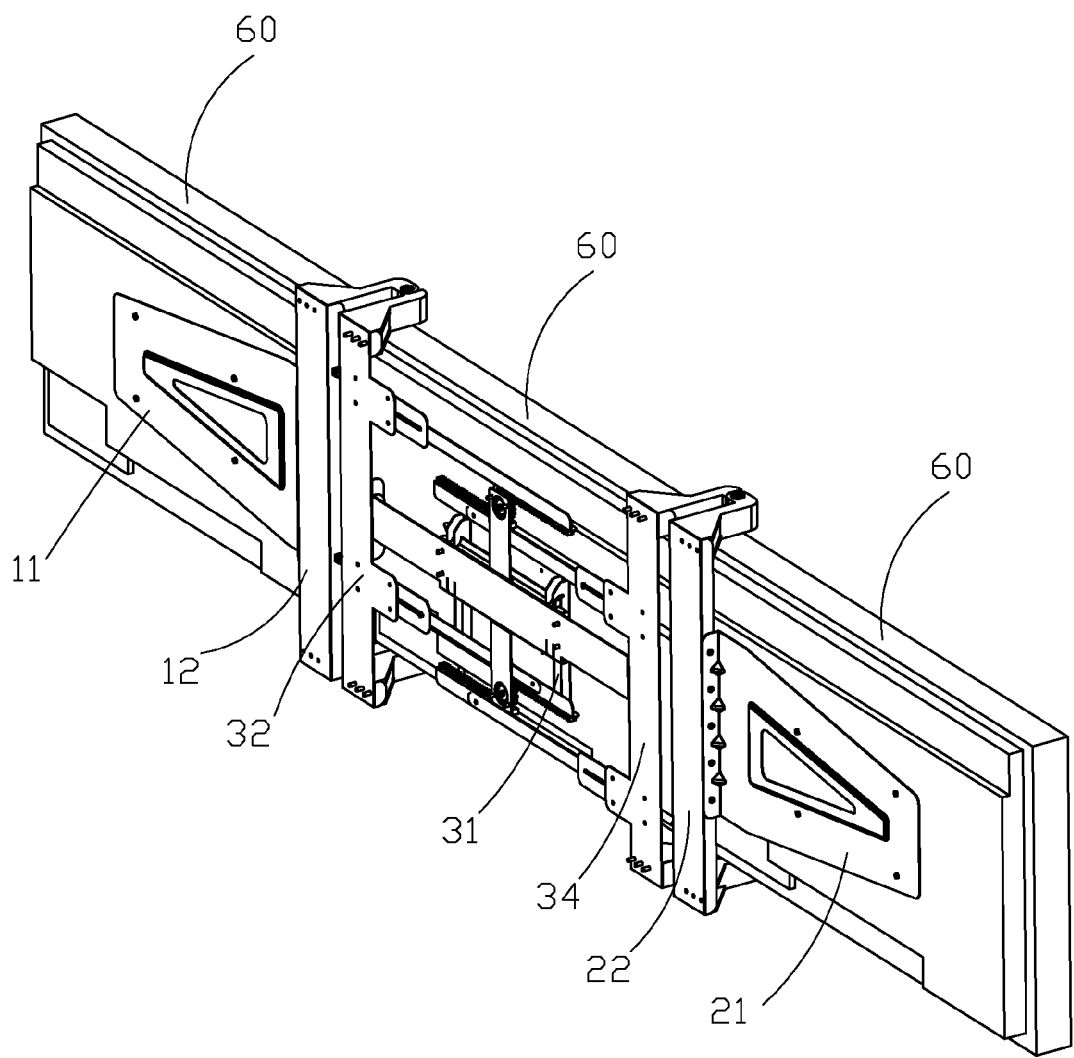
FIG. 8 is an isometric view of the mounting device of FIG. 2 with multiple screens in a first state.

FIGS. 1 and 2 illustrate a mounting device for multiple screens 100. The mounting device 100 includes a first fixing member 10, a second fixing member 20, a third fixing member 30, and a linking assembly 40. The first fixing member 10 and the second fixing member 20 pivot on either side of the third fixing member 30. The third fixing member 30 can be fixed on a wall. The linking assembly 40 communicates with the first fixing member 10, the second fixing member 20, and the third fixing member 30 to enable the first fixing member 10 and the second fixing member 20 to rotate relative to the third fixing member 30. Each of the first fixing member 10, the second fixing member 20, and the third fixing member 30 is configured to fix one screen 60 (shown in FIG. 8).

Figure 3:
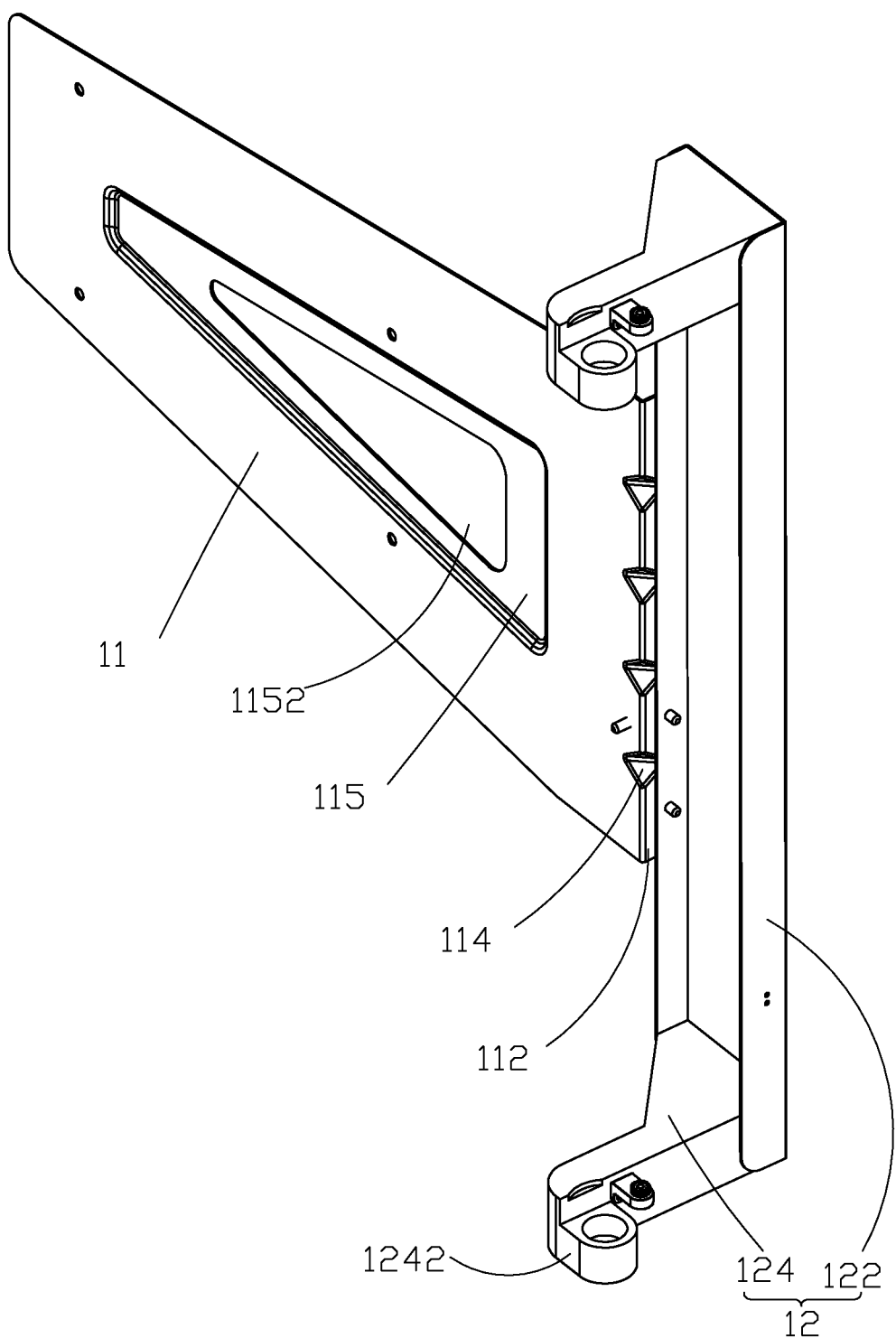
FIG. 3 is an isometric view of the first fixing member in FIG. 1.
Figure 7:
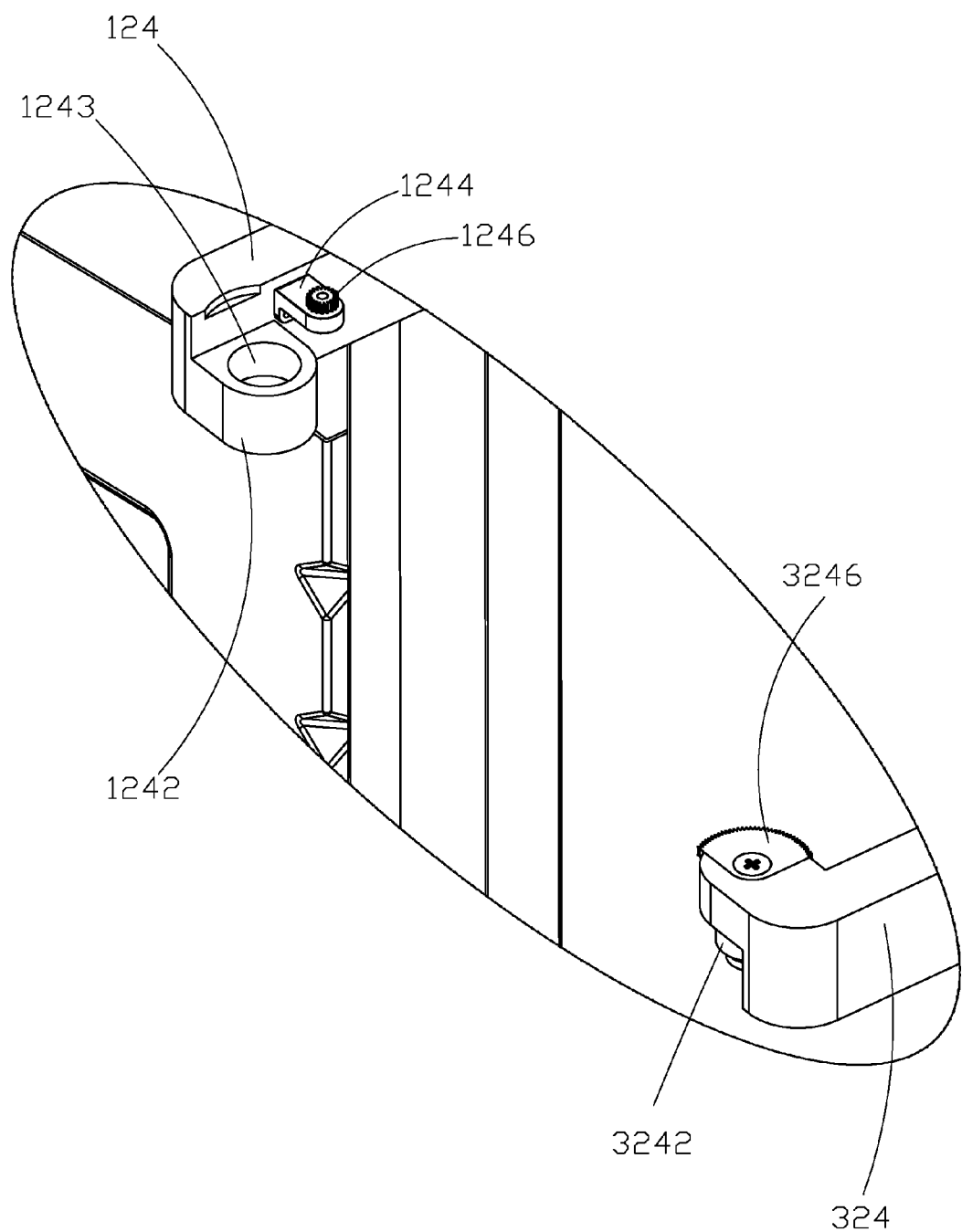
FIG. 7 is an enlarged view of a circled portion I in FIG. 4.

FIGS. 3 and 7 illustrate that the first fixing member 10 includes a first board 11 configured to fix one screen 60 (shown in FIG. 8) and a first supporting portion 12 fixed to a side of the first board 11. In at least one embodiment, the first board 11 is substantially in a trapeziform shape, and forms a first recess portion 115. The first recess portion 115 is recessed from a surface of the first board 11 to which the screen 60 is mounted. The first recess portion 115 forms a first opening 1152 for heat-dissipation of the screen 60. A first bending portion 112 is located at an end of the first board 11. A plurality of first protrusions 114 protrude from a connection portion between the first bending portion 112 and the first board 11. The first supporting portion 12 includes a first connecting pillar 122. The first bending portion 112 is fixed on the side of the first connecting pillar 122. Two first connecting blocks 124 are located at opposite ends of the first connecting pillar 122. In at least one embodiment, the first connecting block 124 is hollow and substantially L-shaped. An end of the connecting block 124 away from the first connecting pillar 122 defines a first coupling portion 1242 vertical to the connecting block 124. A middle of the coupling portion 1242 forms a hole 1243. An engaging portion 1244 is fixed on the first connecting block 124 close to the first coupling portion 1242 and a first tooth 1246 protrudes from the engaging portion 1244.

Figure 4:
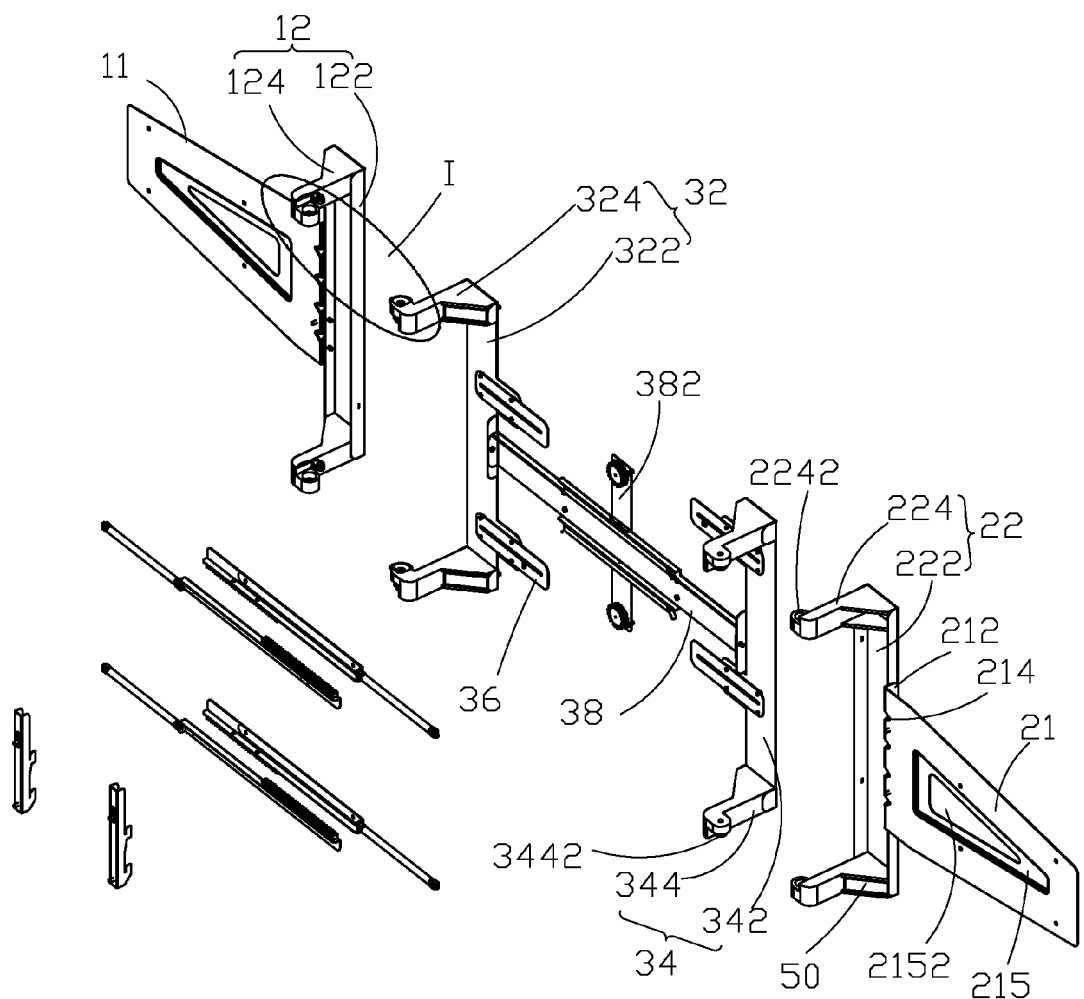
FIG. 4 is an exploded view of the mounting device of FIG. 1.
Figure 5:
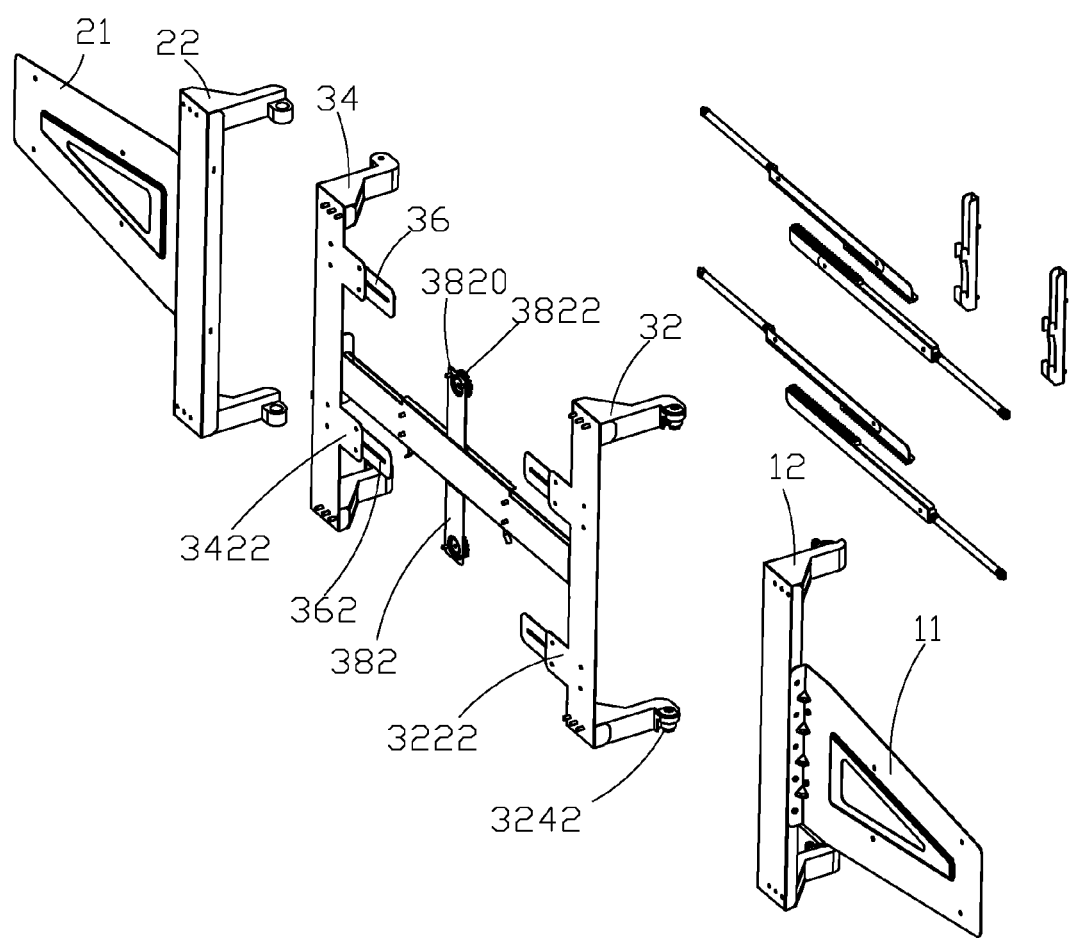
FIG. 5 is an exploded view of the mounting device of FIG. 2.

FIGS. 4 and 5 illustrate that the second fixing member 20 includes a second board 21 and a second supporting portion 22 fixed to the second board 21. In at least one embodiment, the second board 21 is substantially in a trapeziform shape. A second recess portion 215 is recessed from a surface of the second board 21 to which the screen 60 is mounted. The second recess portion 215 defines a second opening 2152 for heat-dissipation of the screen 60. A second bending portion 212 is located at an end of the second board 21. A plurality of second protrusions 214 protrude from a connection portion between the second bending portion 212 and the second board 21. The second supporting portion 12 includes a second connecting pillar 222 and two second connecting blocks 224 fixed at opposite ends of the second connecting pillar 222. In at least one embodiment, the second connecting block 224 is hollow and substantially L-shaped. Reinforcements 50 are located on first connecting blocks 124 and on the second connecting blocks 224 to strengthen and reinforce the first connecting blocks 124 and the second connecting blocks 224. An end of the second connecting block 224 away from the second connecting pillar 222 defines a second coupling portion 2242 of which the shape is the same as the first coupling portion 1242.

FIGS. 1 and 2 illustrate that the third fixing member 30 includes a supporting shelf 31, a third supporting portion 32, a fourth supporting portion 34, a connecting sheet 36, and a coupling board 38. The third supporting portion 32 and the fourth supporting portion 34 are fixed at opposite ends of the coupling board 38 and are vertical to the coupling board 38. The supporting shelf 31 is fixed on the middle of the coupling board 38 and configured to support one screen 60 (shown in FIG. 8). A plank 382 fixed on the coupling board 38 is vertical to the coupling board 38. Each opposite end of the plank 382 forms a protruding portion 3820 (shown in FIG. 5). A linking gear 3822 is fixed on the protruding portion 3820.

FIGS. 4-5 and 7 illustrate that the third supporting portion 32 includes a third connecting pillar 322 and two third connecting blocks 324 located at two ends of the third connecting pillar 322. Two first extending portions 3222 protruding from the third connecting pillar 322 are symmetrical around the coupling board 38. The third connecting block 324 is hollow and substantially L-shaped. A third coupling portion 3242 is located at an end of the third connecting block 324 away from the third connecting pillar 322. A second tooth 3246 fixed on the third coupling portion 3242 engages with the first tooth 1246.

The fourth supporting portion 34 includes a fourth connecting pillar 342 and two fourth connecting blocks 344 located on two ends of the fourth connecting pillar 342. Two second extending portions 3422 protruding from the fourth connecting pillar 342 are symmetrical around the coupling board 38. A shape of the second extending portion 3422 is the same as a shape of the first extending portion 3222. Each of the second extending portions 3422 and the first extending portions 3222 supports a connecting sheet 36 protruding from the second extending portions 3422 and the first extending portions 3222, each of the connecting sheets 36 defines a groove 362. The fourth connecting block 344 is hollow and substantially L-shaped. A fourth coupling portion 3442 located at an end of the fourth connecting block 344 away from the fourth connecting pillar 34 is engaged with the second coupling portion 2242. A shape of the fourth coupling portion 3442 is the same as a shape of the third coupling portion 3242.

Figure 6:
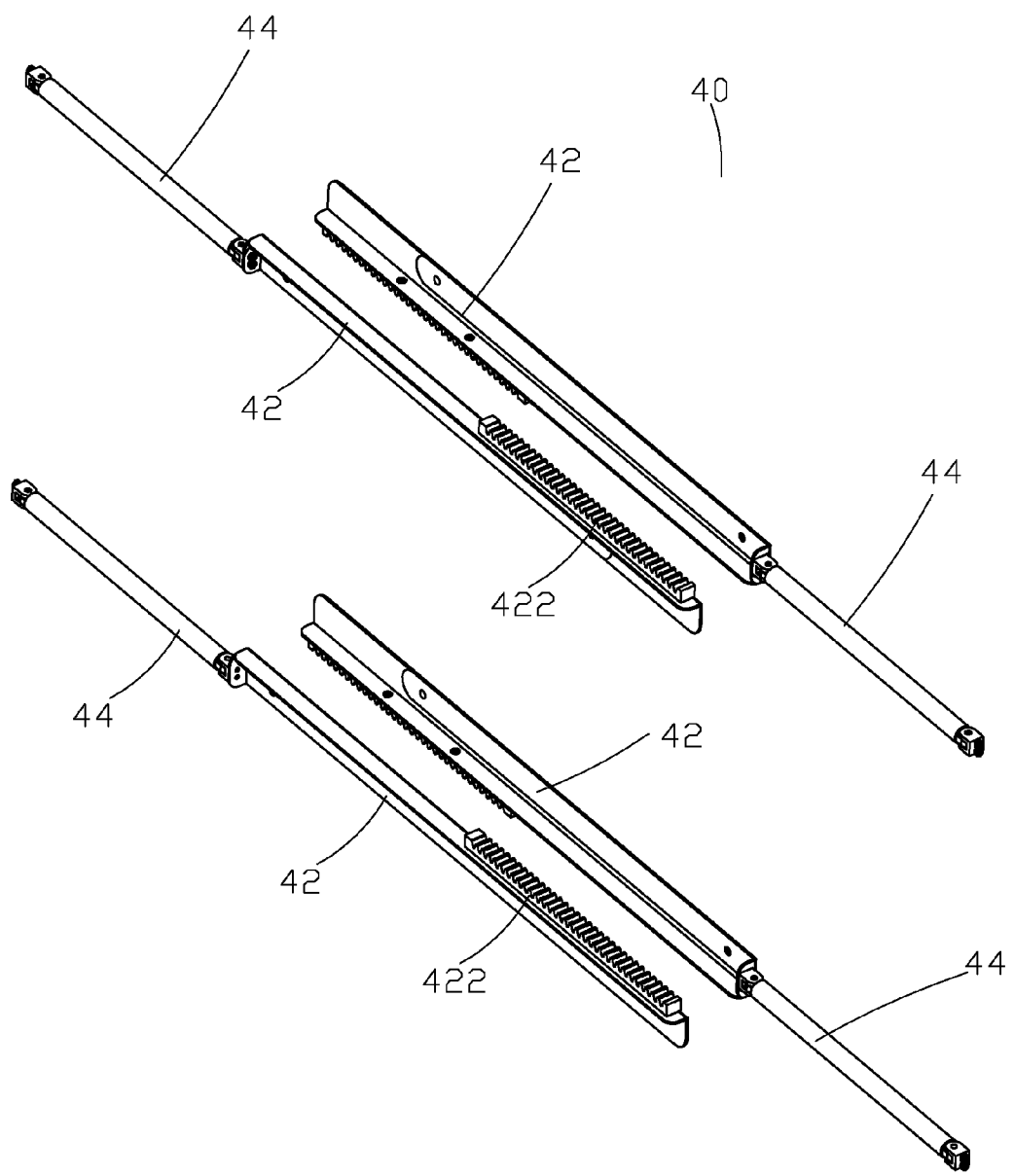
FIG. 6 an exploded view of the linking assembly in FIG. 1.

FIG. 6 illustrates that in at least one embodiment, there are two linking assemblies 40. Each of the linking assemblies 40 includes two first segments 42 and two second segments 44. In at least one embodiment, one end of each of the second segments 44 connects rotatably to the first segment 42, and another end connects rotatably to either the first connecting pillar 122 or the second connecting pillar 222. One end of each first segment 42 away from the second segment 44 is fixed in the groove 362 and can slide in the groove 362. A teeth portion 422 is fixed on one end of the first segment 42, the teeth portion 422 engages to the linking gear 3822.

In assembly, the first fixing member 10 is combined with the third fixing member 30 via the first coupling portion 1242 encircling the third coupling portion 3242, and the first teeth 1246 engages with the second teeth 3246. The second fixing member 20 is combined with the third fixing member 30 via the second coupling portion 2242 encircling the fourth coupling portion 3442. Thus, the first fixing member 10 and the second fixing member 20 pivot on the third fixing 30. The first segment 42 of the linking assembly 40 is fixed in the groove 362 and the second segment 44 pivots on the first connecting pillar 122 or on the second connecting pillar 222. The linking assembly 40 links the first fixing member 10 and the second fixing member 20 together, across the third fixing member 30 and the assembly is thus complete.

Figure 9:
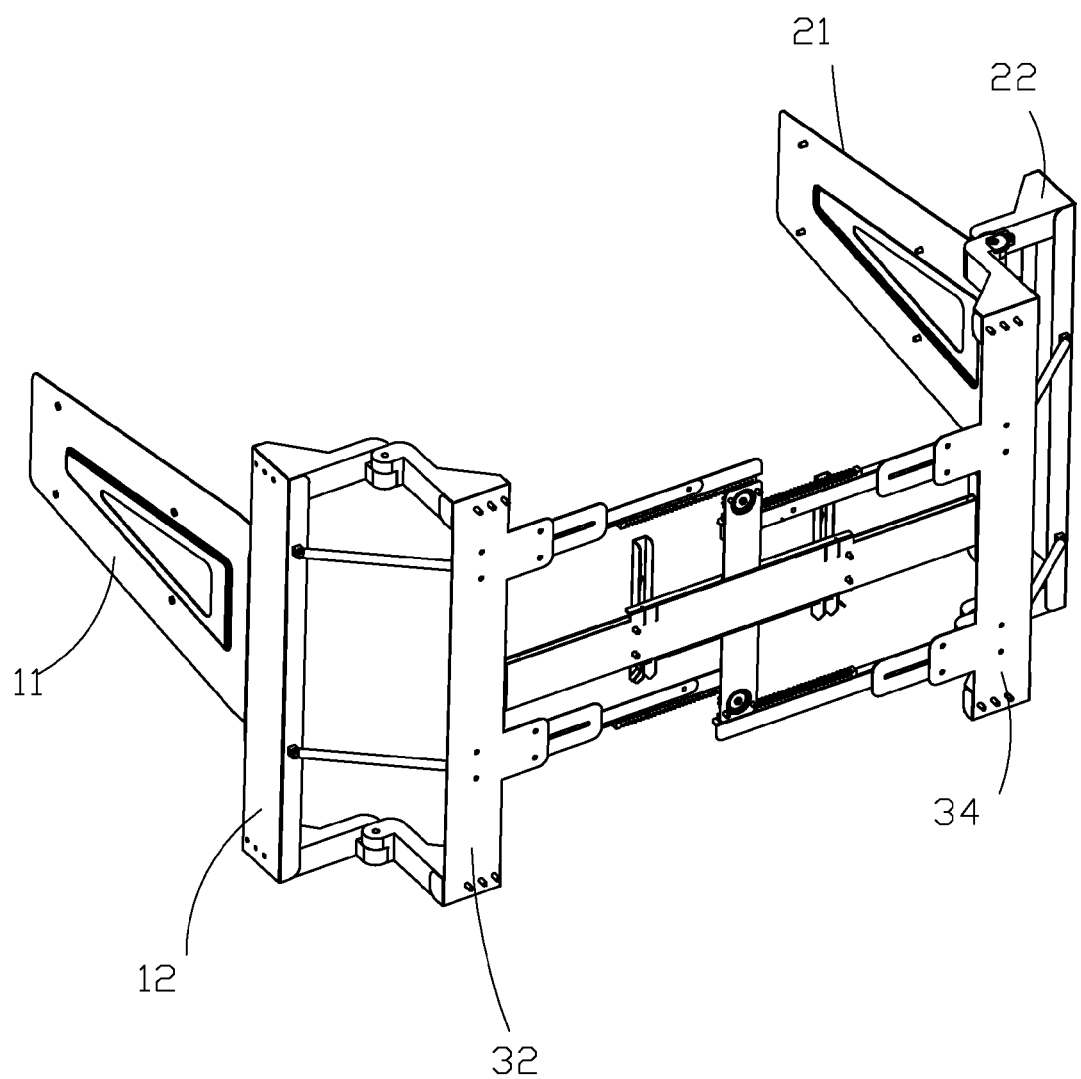
FIG. 9 is an isometric view of the mounting device of FIG. 1 in a second state.

When the first fixing member 10 is rotated, the second segment 44 connected with the first fixing member 10 rotates relative to the first fixing member 10, one of the two first segments 42 slides in the groove 362 of the flake 36, the linking gear 3822 is driven by the teeth portion 422 to rotate to drive another of the two first segments 42 to slide in the groove 362. The second segment 44 connected with the second fixing member 20 is driven to rotate the second fixing member 20. When the first fixing member 10 is rotated, the linking assembly 40 drives the second fixing member 20 to rotate. When the second fixing member 20 is rotated, the linking assembly 40 drives the first fixing member 10 to rotate (referring to the FIG. 9).

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A mounting device for multiple screens comprising:
    a first fixing member configured to have one screen mounted thereto;
    a second fixing member configured to have one screen mounted thereto;
    a third fixing member fixed on an object and configured to have one screen mounted thereto, opposite ends of the third fixing member pivotably coupling the first fixing member to the second fixing member;
    a linking gear fixed on the third fixing member; and
    a linking assembly with two opposite ends connected to the first fixing member and the second fixing member, the linking assembly defining a teeth portion engaged to the linking gear;
    wherein the linking assembly is engaged with the linking gear to simultaneously drive the first fixing member and the second fixing member to rotate with respect to the third fixing member; wherein the first fixing member comprises a first supporting portion forming a first coupling portion, the second fixing member comprises a second supporting portion forming a second coupling portion, the third fixing member comprises a third supporting portion forming a third coupling portion and a fourth supporting portion forming a fourth coupling portion, the first coupling portion is pivotably coupled to the third coupling portion, the second coupling portion is pivotably coupled to the fourth coupling portion; wherein the first supporting portion comprises a first connecting pillar and two first connecting blocks fixed on the opposite ends of the first connecting pillar, the first coupling portion is located at end of the first connecting block away from the first connecting pillar.

2. The mounting device of claim 1, wherein the linking assembly comprises two first segments and two second segments, the teeth portion is located on the first segment, one end of each of two second segments connects rotatably to the first segment, and the other end of each of the two second segments connects rotatably to one of the first fixing member and the second fixing member.

3. The mounting device of claim 2, wherein a plurality of connecting sheets are fixed on the third fixing member, each of the connecting sheets defines a groove, the first segment is fixed in the groove and can slide in the groove.

4. The mounting device of claim 1, wherein a first teeth is fixed on the first fixing member, a second teeth fixed on the third fixing member engages to the first teeth.

5. The mounting device of claim 1, wherein a coupling board is coupled between the third supporting portion and the fourth supporting portion, a plank is fixed on the coupling board, the linking gear is fixed at the end of the plank.

6. The mounting device of claim 5, wherein the first fixing member comprises a first board fixed on the first supporting portion, the second fixing member comprises a second board fixed on the second supporting portion, the screens are fixed on the first board and the second board.

7. A mounting device for multiple screens comprising:
a first fixing member;
a second fixing member;
a third fixing member fixed on an object, opposite ends of the third fixing member pivotably coupled to the first fixing member and the second fixing member;
a linking gear fixed on the third fixing member; and
a linking assembly with two opposite ends connected to the first fixing member and the second fixing member, the linking assembly defining a teeth portion engaged to the linking gear;
wherein the first fixing member, the second fixing member, and the third fixing member are configured to have the multiple screens mounted thereto; the first fixing member is rotated to drive the second fixing member to rotate with respect to the third fixing member by the linking assembly engaging to the linking gear; wherein the first fixing member comprises a first supporting portion forming a first coupling portion, the second fixing member comprises a second supporting portion forming a second coupling portion, the third fixing member comprises a third supporting portion forming a third coupling portion and a fourth supporting portion forming a fourth coupling portion, the first coupling portion is pivotably coupled to the third coupling portion, the second coupling portion is pivotably coupled to the fourth coupling portion; wherein the first supporting portion comprises a first connecting pillar and two first connecting blocks fixed on the opposite ends of the first connecting pillar, the first coupling portion is located at end of the first connecting block away from the first connecting pillar.

8. The mounting device of claim 7, wherein the linking assembly comprises two first segments and two second segments, the teeth portion is located on the first segment, one end of each of two second segments connects rotatably to the first segment, and the other end of each of the two second segments connects rotatably to one of the first fixing member and the second fixing member.

9. The mounting device of claim 8, wherein a plurality of connecting sheets are fixed on the third fixing member, each of the connecting sheets defines a groove, the first segment is fixed in the groove and can slide in the groove.

10. The mounting device of claim 7, wherein first teeth is fixed on the first fixing member, second teeth fixed on the third fixing member engages to the first teeth.

11. The mounting device of claim 7, wherein a coupling board is coupled between the third supporting portion and the fourth supporting portion, a plank is fixed on the coupling board, the linking gear is fixed at the end of the plank.

12. The mounting device of claim 11, wherein the first fixing member comprises a first board fixed on the first supporting portion, the second fixing member comprises a second board fixed on the second supporting portion, the screens are fixed on the first board and the second board.

* * * * *